Feb. 9, 1932.  A. P. PLAUT  1,844,045
INTAKE MANIFOLD FOR INTERNAL COMBUSTION ENGINES
Filed Sept. 8, 1924
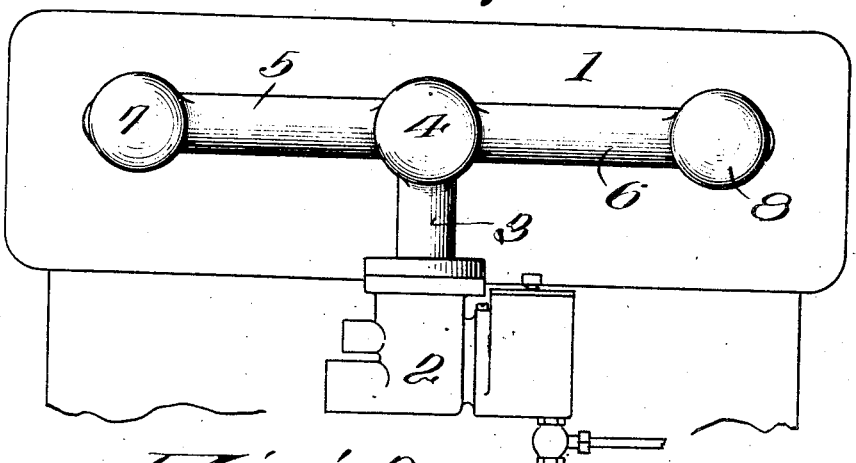
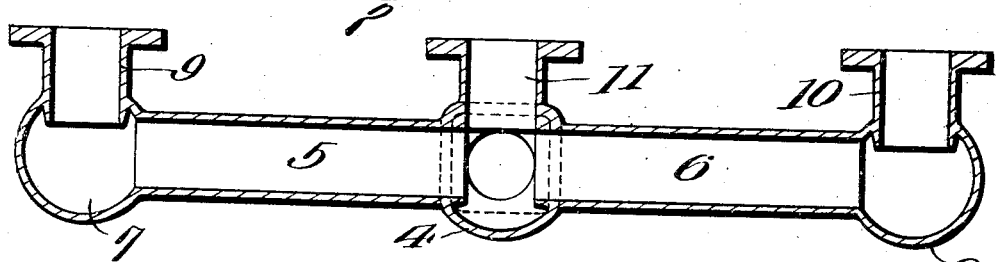
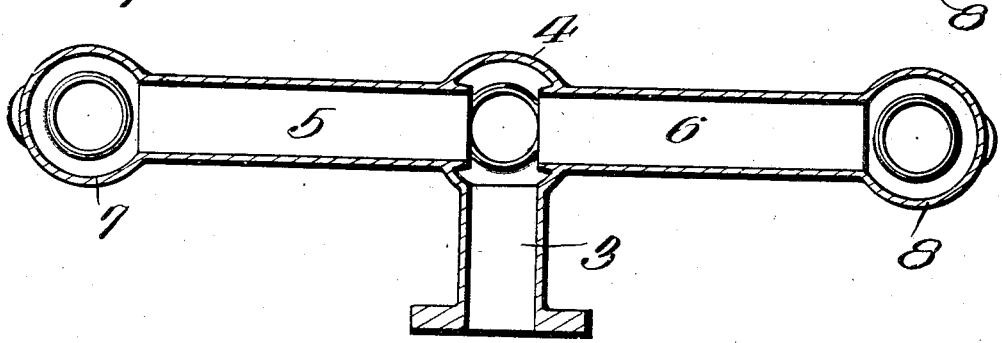
Inventor
A. P. PLAUT.

Patented Feb. 9, 1932

1,844,045

UNITED STATES PATENT OFFICE

ANTOINE P. PLAUT, OF FLINT, MICHIGAN, ASSIGNOR OF ONE-HALF TO MARVEL CARBURETER COMPANY, OF FLINT, MICHIGAN, A CORPORATION OF INDIANA

INTAKE MANIFOLD FOR INTERNAL COMBUSTION ENGINES

Application filed September 8, 1924. Serial No. 736,607.

This invention relates to certain new and useful improvements in intake manifolds for internal combustion engines, the object being to provide a manifold which is so constructed that the liquid fuel which accumulates on the walls of the manifold is prevented from being thrown suddenly into the distributing branches.

Another and further object of the invention is to provide a manifold which is provided with enlargements into which the branches extend so as to form baffles to arrest the passage of the liquid fuel or unvaporized particles of the mixture in its passage therethrough.

Other and further objects of the invention will be hereinafter set forth and the novel features thereof defined by the appended claims.

In the drawings,

Figure 1 is a side elevation of an internal combustion engine showing the application of my improved construction of manifold thereto;

Figure 2 is a longitudinal horizontal section through the manifold constructed in accordance with my invention; and Figure 3 is a vertical section through the same.

In the drawings, 1 indicates the internal combustion engine, and 2 the charge forming device, the above being illustrated so that the application of my improved construction of intake manifold to an internal combustion engine can be readily understood.

In carrying out my invention I employ a central riser 3, to the lower end of which is adapted to be connected a charge forming device 2 as clearly shown in Figure 1. The riser terminates at its upper end in a spherical enlargement 4 into which extend the oppositely disposed ends of main arms 5 and 6, said arms extending into the spherical enlargement in order to prevent the liquid fuel accumulating on the walls of the enlargement from passing into the main arms.

The arms 5 and 6 terminate in spherical enlargements 7 and 8, from which extend the end branches 9 and 10 adapted to be connected to the intake ports of the internal combustion engine in the usual manner. These branches 9 and 10 extend into the spherical enlargements 7 and 8 in order to prevent the fuel which accumulates in the arms 5 and 6 and the enlargements 7 and 8 from being thrown suddenly through the branches 9 and 10 into the intake ports of the internal combustion engine.

The main enlargement 4 has extending therefrom a central branch 11 which is connected to the intake port of the internal combustion engine, said branch extending into the enlargement 4 as clearly shown in Figure 3 so that the fuel which accumulates in the enlargement is prevented from being suddenly thrown through the branch 11 into the intake ports of the internal combustion engine.

In the embodiment of the invention as herein shown the arms 5 and 6 and the branches 9, 10 and 11 extend into spherical enlargements at such a distance that any fuel which accumulates on the walls of these members is caused to work backwardly so that they will be subjected to the current of mixture in its passage through the manifold whereby this liquid fuel will be vaporized before it is delivered to the intake of the internal combustion engine.

While I have shown a manifold constructed in a particular manner, it is, of course, understood that I do not wish to limit myself to the details of construction as my invention consists broadly in providing enlargements into which the branches extend so as to form baffles to retard the liquid fuel or unvaporized fuel from being thrown through the branches into the internal combustion engine.

What I claim is:—

1. An intake manifold for internal combustion engines having spherical enlargements connected together by arms, branches extending from said enlargements to the intake ports of the integral combustion engine, a riser connected to one of said enlargements, said branches extending into the spherical enlargements to form baffles for preventing the liquid fuel from being thrown suddenly into the intake ports of the engine.

2. The combination with an internal combustion engine and a charge forming device therefor, of an intake manifold connected to said charge forming device having a central riser terminating in a spherical enlargement, arms extending from said spherical enlargement terminating in enlargements, said enlargements having branches extending therefrom to the intake ports of the internal combustion engine, the inner ends of the branches extending into the enlargements to form baffles and the inner ends of the arms extending into the central enlargement to form baffles for preventing the passage of the accumulated liquid fuel on the walls of the manifold from being drawn into the cylinders of the engine.

3. An intake manifold for internal combustion engines comprising a vertically disposed riser terminating in a spherical enlargement, horizontally disposed branches extending from opposite sides of said enlargement terminating in spherical enlargements arranged in the same horizontal plane as the first mentioned enlargement, said branches having their inner ends extending into the central enlargement and branches extending from said enlargements, said branches being arranged in the same horizontal plane.

In testimony whereof I hereunto affix my signature.

ANTOINE P. PLAUT.